Aug. 1, 1933.  W. M. BAILEY  1,920,177

CAPACITOR

Filed Oct. 29, 1929

INVENTOR
William M. Bailey
BY Philip Farnsworth
ATTORNEY

Patented Aug. 1, 1933

1,920,177

UNITED STATES PATENT OFFICE 1,920,177

CAPACITOR

William M. Bailey, Lynn, Mass., assignor, by mesne assignments, to General Electric Company, a Corporation of New York Application October 29, 1929. Serial No. 403,153

5 Claims. (Cl. 175—41)

This invention relates to improvements in capacitors and more particularly to condensers of the compressed stack type.

It is an object of the invention to provide an improved capacitor which is provided with novel means to maintain the stack under compression.

Yet another object is to provide a simplified condenser structure wherein the cover is utilized to maintain the stack under compression.

A further object is to provide a condenser structure in which means are provided to maintain the stack under compression and such means are further utilized to fix the position of the stack within the casing.

With these and other equally important objects in view, the invention comprises a capacitor and a cooperating casing, the assemblage being so constituted and arranged that a means for maintaining the stack under compression is directly associated with a portion of the cover and such pressure means also maintains the stack rigidly to insure equal margins for insulation to prevent sparking to the metal casing.

In order to render the invention more readily understood, a preferred embodiment of it is shown in the accompanying drawing in which.

Figure 1:
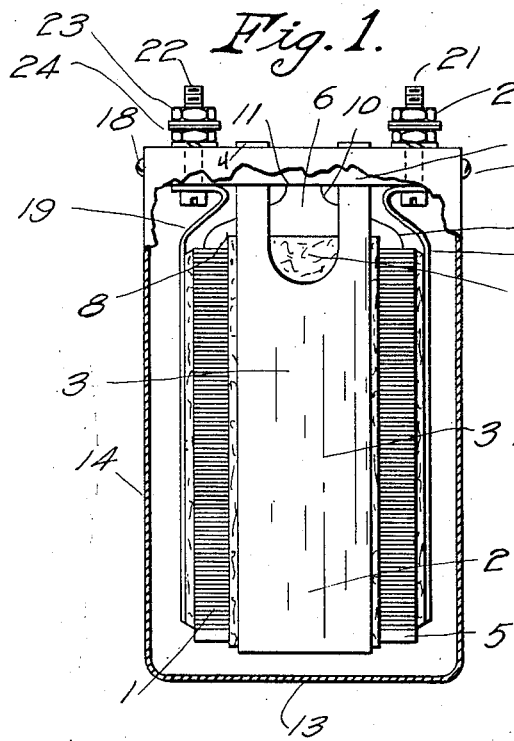
Fig. 1 is a side elevation having portions broken away to show the interior construction.

In accordance with the invention, a condenser stack is provided with a tension strap which cooperates with a pressure member and the cover of the casing to maintain the stack under compression. Preferably the tension member is so positioned as to be effective in holding the stack against displacement. By such construction, as will be seen more clearly hereinafter, a condenser unit of great rigidity and simplicity is secured.

As shown in the drawing, this device comprises a condenser stack 1, made up in any desired manner of a series of alternate foils and dielectrics. The stack is shown conventionally but it will be understood that this may be of any desired type with a single section or a plurality of sections making up any desired series or parallel sectional arrangements possible.

Cooperating with the stack is a pressure member, as 6, which, with other associated elements, to be described further, maintains the stack under any desired compression. In the preferred modification, the associated elements include a tension strap or stirrup-plate 2. This is substantially U shaped and is of a dimension conforming to the size of the stack. This member has two vertical side sections 3, and an integral bottom section 3, Fig. 2. Near the upper end, each side section has tongues 4, made integral, which are received by the apertures in the cover and after applying the desired pressure are bent over, securing the stack under compression.

As will be seen from an inspection of the drawing, the flexible metal strap 2 is insulated from the stack. This may be done by interposing the insulating fillers 5 between the stack and the strap. As shown, these filler strips are coextensive with the length of the stack so as to space the strap therefrom and prevent electrical contact.

A similar insulating strip is placed between the bottom of the strap and the bottom of the stack. If desired the bottom insulation may be of substantially the same dimensions as the stack bottom so as to provide a firm base therefor.

Figure 2:
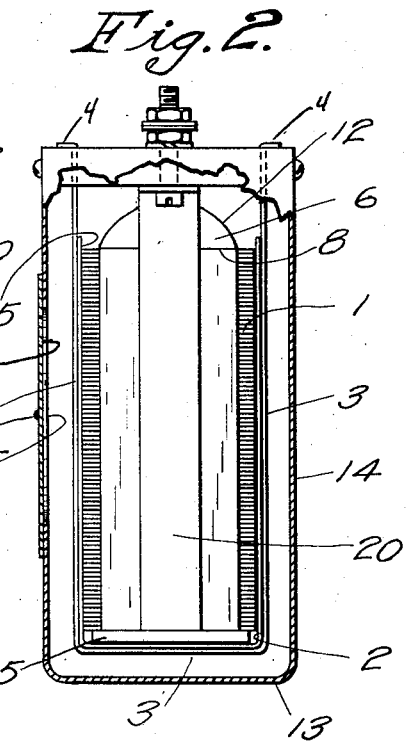
Fig. 2 is a similar end elevation.
Figure 3:
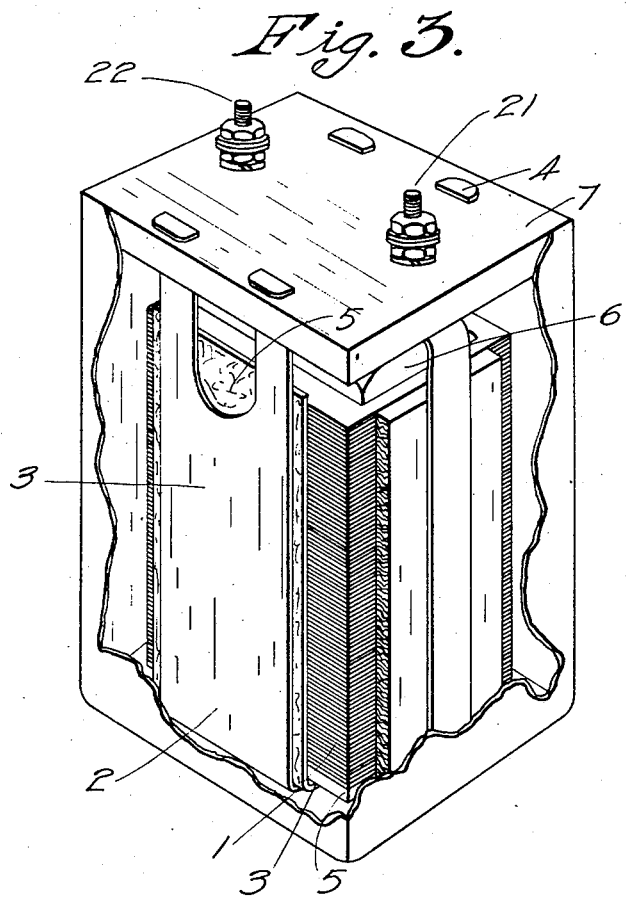
Fig. 3 is a perspective view of the stack.
Figure 4:
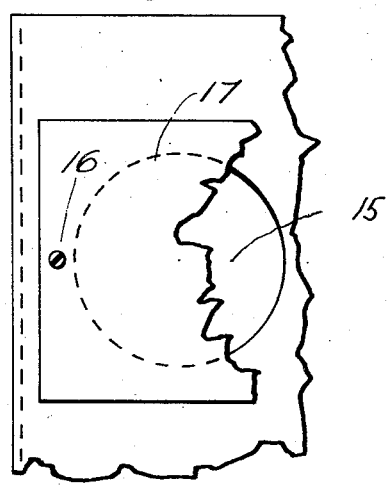
Fig. 4 is an enlarged detail of a portion of the casing, showing the method of covering the filling hole with the manufacturer's nameplate.

As shown more particularly in Figs. 1 and 2, a pressure member 6, and an insulating cover plate or support 7, cooperate with member 2 to maintain the stack under compression. The pressure member 6 comprises a flat base section 8 which extends over substantially the entire area of the upper face of the stack. This base section is tapered or reduced in an upward direction as shown at 9 and 10. The upper portion comprises a flat knob, 11, which bears against the lower face of the cover plate 7. It will be noted that the tapered construction shown at 9 and the integral extension 10 permits a relatively great depth of material in the pressure member 6, without however, interfering with the curvilinear outline of the stirrup-plate 2 as shown at 12.

The pressure member 6 is made up of a block of metal or insulating material, cast or machined of an area and depth which conform to the requirements of the particular stack and casing which is employed. While the pressure member 6 is spoken of as being a separate member, it will be appreciated that it may, if desired, be made integral with the cover 7. An advantage of the separate construction is that it is possible with such a structure to utilize a standard size cover plate 7, then, depending on the height of the stack, a follower 6 of greater or less depth may be employed. The follower or pressure member 6, because of its shape, is self-centering and distributes the pressure evenly over the active area of the stack, i. e., the coincident areas of dielectric sheets and armature sheets.

The cover member 7 is adapted to cooperate with a casing to house the assemblage. As shown, the casing comprises an open-top box-like structure having a bottom portion 13 and sides 14. One of the sides 14 is provided with a large aperture 15 which permits the admission of a plastic embedment. Adjacent to the aperture, the side may be tapped to receive screws or similar securing means 16. These screws serve to secure the closure 17 in closed position to completely seal the container. The closure member 17 may be suitably inscribed to serve as a nameplate. The casing may be secured to the support 7 by any suitable means such as tap screws 18.

The assemblage and function of the several elements of the combination and the character of the resultant unit will have been appreciated from the foregoing description. In making up the unit the stack 1 is formed on a suitable jig so as to provide a series of foils and interposed dielectrics. Suitable terminal leads 19 and 20 are provided in the manner known to those skilled in the art.

There are also provided holes in the insulating cover 7 for a pair of terminal screws 21 and 22 together with suitable nuts 23 and washers 24. These screws are for the purpose of connecting to the cover 7 the terminal leads 19—20 from the stack, and also provide a convenient means for external connections to the unit.

In the position of the parts, the pressure member 6, whether integral with, or separate from the cover 7, in conjunction with the tension strip 2, maintains the stack under the desired pressure. It will be noted that the follower 6 abuts substantially the entire upper face of the stack so that the active areas of the stack-sheets are clamped together. It will be noted further that the downward thrust of the pressure member 6 is imparted substantially uniformly at the central axis of the stack by way of the central top flat knob 11. Inasmuch as the tension strap 2 is secured to the cover 7 in substantial alignment with the edges of the stack, and the other point of reaction, as explained, is subsantially evenly distributed at the center, the stack itself becomes, so to speak, self positioning. As pointed out previously, the stirrup-plate 2, due to its particular position and configuration, serves not only to impart pressure on the stack, but also positively prevents any lateral movement thereof transversely to its plane of contact. In this circumstance also, it will be noted that the insulating strips 5 are being firmly held by the tension strap, and have a wide area of engagement with the stack and assist in preventing twisting movement thereof. A plurality of spacer members may be inserted between members 3 and 5 to give a desired increase in pressure, the added spacer members being wedged into position after the unit has been formed.

The tension stirrup-plate 2 being positively secured to the cover by bending the tongues 4, holds the stack in compression and supports it. Also it will be noted that, due to the wide area of contact between the stirrup-plate and the stack the stirrup positively prevents lateral movement of the stack and also opposes any twisting movement. The structure, therefore, while simple, is of eminent solidarity and rigidity.

All the parts which cooperate with the stack are of low cost, particularly the sheet-insulation 5 and the sheet metal stirrup-plate 2 and casing 14, and the acts of assembling are simple and easy. The stirrup-plate especially is of low cost and constitutes the greater part of the clamping system. The condenser is complete, with insulating cover 7 supporting all the parts, before the casing is applied which then is supported by the cover, so that the filling embedment in the space around the stack and stirrup-plate 2 and member 6 also is supported by the cover; all by way of the plate-tongues 4 which constitute a non-threaded securing means of low cost quickly applied. The compactness provided by the construction also is useful, and as to that, among other features, no space is wasted between the legs of stirrup-plate 2 which lie as close to the stack-sides as is permitted by the thin insulating plates 5; and little space is needed to space the casing 14 from the terminal-leads 19, 20 and the legs of plate 2. As to compactness of the structure longitudinally of the stack, altho cover 7 is spaced from the stack-end, yet this space is employed usefully for the leads 19, 20, the compression-member 6 and the filler in which the leads are embedded, said filler embedding the inner ends of the terminals mounted in the insulating cover, and adjoining almost the entire inner surface of cover 7. The space between the cover and the neighboring stack-end is in free communication with the rest of the space inside casing 14 so that a single casting of filler introduced thru casing-opening 15 completely surrounds the stack, leads, stirrup-plate and compressor 6 save for the small central upper portion of the latter which extends to cover 7. Just as no machine-work such as screw-threads, etc. is needed for stirrup-plate 2, so the construction and arrangement of compressor 6 avoids need of machine-work on it, since its perifery lies centrally wholly inside of the legs of plate 2, and inside of leads 19, 20 so that no holes in compressor 9 are required for the passage of said terminals and plate-legs. The special inclined construction of member 6 provides a free space for the inward extension of terminals 19, 20, Fig. 1, away from metallic casing 14, such inward extension of the leads being remote also from the metallic legs of plate 2 because the leads extend in the middle of the space between the two U-legs 3 of plate 2. In this construction, the locations of terminals 21, 22 on insulating casing 7 can be and is such that, with ample distance of each terminal from the other and from each of metallic tongues 4 of plate 2, the terminals may be and are located in longitudinal alinement with the leads along the sides of the stack and connected to the projecting stack-armatures, just as the legs 3 of plate 2 extend straight out to and thru insulating cover 7 on opposite sides of compressor member 6. The low labor cost of assembly, which is a valuable feature in addition to the low cost of the elements, involves, after the stack building, and the application of terminal 21, 22 to cover 7, only the placing of insulating sheets 5 on the stack, the application of stirrup-plate 2, the insertion of member 6 between the plate-legs 3 on top of the stack, the placing of the cover 7 on member 6 so that tongues 4 project up thru the cover, the bending down of tongues 4, the soldering of leads 19, 20 to the projecting stack-armatures and clamping their ends to the terminals 21, 22; the bending down of tongues 4 serving to hold the stack under any desired compression. As shown, cover 7 of insulating material to receive the two terminals and the metallic tongues 4, is thick enough to take the clamping-stresses which it must do because it is the sole means of transmitting them from the tensioning plate-legs 3, 3 to member 6 which is not connected to said legs but merely interposed between cover 7 and the stack-end, and between legs 3, 3, so that actually the insulating cover is the stack-compressing member, and member 6, merely a branch from the clamping system 2, 7, is merely a partial filler or spacer between the end of the stack and the compressing cover 7, analogous to the above spacer members which may be wedged between stirrup-plate 2 and insulating sheets 5 in order to increase stack-pressure after the rest of the assembly has been completed. An additional advantage of the U-shaped stirrup-plate 2 which closely hubs the bottom and sides of the stack is that the mass of the stack reenforces and stiffens the sheet metal of the stirrup-plate and when clamping pressure is applied there is no bowing of plate 2 even altho it is of thin flexible metal but on the contrary any tendency of plate 2 to bend as the result of stresses applied to clamp the stack is resisted by the mass of the stack which is useful in effecting the object of clamping the stack; and any increase of tension on the legs of thin plate U has none other than a useful effect in maintaining in alinement the edges of the dielectric stack-sheets. The casing is selected for depth corresponding to the length of the stack, so that the proper filling space is provided at the bottom of the casing and between it and the bottom of plate 2 and the bottom of the stack.

After the unit is made up and placed under compression as described, the casing 14 is secured to the top member 7. As explained, this may be done by the screws 18. The device may then be placed on its side and a plasticised insulating embedment flowed in through the filling hole 15. As is understood, this may be run in while hot and allowed to solidify in and around the compressed stack. After this operation, the cover or nameplate 17, may be secured in position.

While there is shown and described a preferred embodiment of the invention, it is to be understood that this is given merely as an exemplification of the underlying principles, and since these may be embodied in other mechanical structures, I do not wish to be limited to that shown and described above except as such limitations are clearly imposed by the appended claims.

I claim:

1. A capacitor assemblage including a stack of dielectric and armature sheets, the latter projecting from two opposite sides of the stack, sheet insulating material facing and adjoining other opposite sides of the stack and an end of the stack; a U-shaped flexible sheet metal stirrup-plate having its bottom and side portions in engagement with said sheet insulation thereby holding the dielectric sheets of the stack in alinement with one another and supporting the stack at its bottom by the bottom of the stirrup-plate, the free ends of the stirrup-plate projecting beyond the other end of the stack; two stack-terminal leads projecting from the projecting stack-armatures in the same direction as said free stirrup-plate-ends beyond said stack-end; a casing-cover of insulating material facing said other stack-end and apertured for said stirrup-plate-ends, the latter projecting thru said apertures beyond said cover; two terminals respectively connected to said terminal-leads and mounted in said insulating casing-cover; said insulating cover having superficial dimensions larger than said stack-end providing ample space for separation of said terminals and metallic stirrup-plate-ends from one another; said projecting stirrup-plate ends being flexible toward the insulating cover and the legs of the stirrup-plate constituting tension clamping members for the stack; stack compressing means engaging said end of the stack and receiving compression stresses from the insulating cover, the stirrup-plate legs and the stirrup-plate bottom when the projecting stirrup-ends are flexed toward the insulating cover, the bottom of the sheet metal stirrup-plate constituting the cooperating stack-compression member; all whereby the insulating casing-cover and the sheet metal stirrup-plate support and clamp the stack and hold the edges of its dielectric sheets in alinement with one another; and the insulating casing-cover projecting laterally beyond all the sides of the stack and the stirrup-plate; and a sheet metal casing secured to the peripheral portion of the insulating casing-cover and having a width and length establishing an interior space between the metallic casing and the sides and bottoms of the stack and metallic stirrup-plate; said casing being formed with a filter-opening for filling said interior space after the stack has been combined with the insulating cover and stirrup-plate and after the metallic casing has been secured to the insulating cover.

2. A capacitor assemblage including a stack of dielectric and armature sheets, sheet insulating material facing and adjoining opposite sides of the stack and holding the edges of its dielectric sheets in alinement with one another and facing and adjoining the bottom of the stack; a U-shaped flexible sheet metal stirrup-plate having its bottom and side portions in engagement with said sheet insulation and supporting the stack at its bottom, the free ends of the stirrup-plate projecting beyond the other end of the stack; a casing-cover of insulating material facing said other stack-end and apertured for said stirrup-plate-ends, the latter projecting thru said apertures and beyond said cover and flexible toward the cover for securing the stirrup-plate and cover together; a circuit terminal mounted on said cover and connected to the stack; and stack-compressing means engaging said other end of the stack and receiving compression stresses from the insulating cover, the stirrup-plate-legs and the stirrup-plate bottom when the projecting stirrup-plate ends are flexed toward the insulating cover.

3. A capacitor assemblage including a stack of dielectric and armature sheets, a U-shaped flexible sheet-metal stirrup-plate lying closely adjacent the sides and one end of the stack, the stack stiffening the sheet metal plate but the plate-bottom constituting a stack compressor and the legs of the plate lying alongside the stack-sides constituting tension members of the stack-clamp, the free ends of the stirrup-plate projecting beyond the other end of the stacks; means insulating the stirrup-plate from the stack; a casing-cover of insulating material facing the other stack-end and apertured for said projecting stirrup-plate ends, the latter projecting thru said apertures and beyond said cover and flexed over the insulating cover for securing the cover and stirrup-plate together; a circuit-terminal mounted in said cover and connected to the stack; and stack-compressing means engaging said other stack end but having its periphery lying between the legs of the stirrup-plate between the stack-end and the cover; said insulating cover constituting a member of the stack-clamping system and transmitting tension stresses from the legs of the stirrup-plate to said stack-compressing means.

4. A capacitor assemblage including a stack of dielectric and armature sheets, a U-shaped flexible sheet-material stirrup-plate lying closely adjacent the sides and one end of the stack and supporting the stack at said end, the stack stiffening the sheet metal plate but the plate bottom constituting a stock compressor and the legs of the plate lying alongside the stack-sides constituting tension members of the stack-clamp and holding the dielectric sheets in alinement, the free ends of the stirrup-plate projecting beyond the other end of the stack; insulating sheets between the stirrup-plate and the stack; a casing-cover of insulating material apertured for said projecting stirrup-plate ends, the latter projecting thru said apertures and beyond said cover and flexed over the cover for securing the cover and stirrup-plate together; a circuit-terminal mounted in said cover and connected to the stack; and a stack compressing member located between the cover and the neighboring stack-end, having the periphery of its portion engaging the stack-end lying between the legs of the stirrup-plate between the stack-end and the cover, and the sides of said compressing member being inclined toward the cover and terminating in a portion engaging the cover and having an area small as compared with its stack-engaging portion, said small-aread portion lying centrally of the cover and stack-end.

5. A capacitor assemblage including a stack of dielectric and armature sheets, a U-shaped flexible sheet metal stirrup-plate lying closely adjacent the sides and one end of the stack and supporting the stack at said end, the legs of the plate which lie alongside the stack-sides constituting tension members of the stack-clamp and holding the dielectric sheets in alinement, the free ends of the stirrup-plate projecting beyond the other end of the stack; a casing-cover of insulating material spaced from said stack-end and apertured for said projecting plate-legs, the latter extending thru said apertures and beyond said cover and flexed over the cover for securing the cover and stirrup-plate together; two terminal-leads extending from the stack across the space between said stack-end and cover; terminals mounted in the cover and connected to said leads, said space between the cover and stack-end being in communication with the space around the sides and bottom of the stack for the reception of a common mass of filler; and a stack-compressor located in said space, extending to the cover and having small-aread central engagement therewith transmitting stack-clamping stresses from the legs of the stirrup-plate by way of the cover to said stack-end for reaction against the bottom of the stirrup-plate lying against the other end of the stack.

WILLIAM M. BAILEY.